Patented May 1, 1934

1,956,950

UNITED STATES PATENT OFFICE 1,956,950

MANUFACTURE OF LÆVO-1-PHENYL-2-METHYLAMINOPROPANOL-1

Gustav Hildebrandt and Wilfrid Klavehn, Mannheim, Germany, assignors, by mesne assignments, to E. Bilhuber, Incorporated, Jersey City, N. J., a corporation of New Jersey No Drawing. Application April 3, 1931, Serial No. 527,608. In Germany April 8, 1930

8 Claims. (Cl. 260—128.5)

The naturally occurring ephedrine obtained from the drug is the lævo-1-phenyl-2-methylamino-propanol-1. This compound has hitherto been obtained synthetically only by resolving synthetic racemic ephedrine obtained by various known processes (Nagai & Kanao: Annalen der Chemie, Vol. 470 page 157; German Patent No. 469,782; Skita & Keil: Berichte der deutschen chemischen Gesellschaft, Vol. 62, 1929, page 1142 et seq.) into its optical isomers (Nagai & Kanao: Annalen der Chemie, Vol. 470 page 157; British Patent No. 297,385; Swiss Patent No. 138,724). There has not hitherto been known a process whereby lævo-1-phenyl-2-methylamino-propanol-1 can be synthesized directly.

According to this invention lævo-1-phenyl-2-methylamino-propanol-1 can be made directly and with a good yield by reducing lævo-1-phenyl-propanol-1-one-2 in presence of methylamine; alternatively, 1-phenylpropanol 1-one-2 may first be condensed with methylamine and the condensation product subsequently reduced.

The lævo phenylpropanolone use as parent material for the invention may be obtained according to the method of Neuberg (Biochemische Zeitschrift, Vol. 115, 1921, page 282, and Vol. 128, 1922, page 610), for example by the fermentation of a solution of sugar with yeast in the presence of benzaldehyde. When the fermentation is ended, the fermentation product, in which is contained the lævo keto-alcohol, is isolated by extraction or distillation and may be reduced as such in presence of methylamine, or the keto-alcohol may be separated from the product and subjected to reduction in presence of methylamine.

The invention affords a new method for the useful application of lævo phenylpropanolone which is easily obtainable by the method of Neuberg, by permitting its conversion into lævo-1-phenyl-2-methylaminopropanol-1.

This direct synthesis of lævo-ephedrine has the further advantage that it does not involve also the production of dextro-ephedrine which is of no therapeutical value, as is the case in the known processes which depend on the resolution of the racemic substance.

The following examples illustrate the invention:

Example 1.—120 grams of the fermentation product containing phenylpropanolone obtained by extraction with ether (cf. Biochemische Zeitschrift Vol. 115, 1921, page 282 et seq.) are allowed to run, without further purification, in the course of about two hours into a solution of 10 grams of methylamine in 500 cc. of ether in presence of 20 grams of activated aluminium for example of the type described in British Patent No. 336,412, whilst stirring. Simultaneously 20–30 grams of water are added, drop by drop. The vigorous reaction which at once sets in is moderated by periodical cooling. Activated aluminium is aluminium which has been superficially amalgamated with mercury. When it contacts with water, it liberates hydrogen and an insoluble aluminium hydroxide is formed. Activated aluminium thus serves as the source of hydrogen for the reaction. When the reaction is complete the ethereal solution is filtered and the optically active base which has been formed is extracted from the filtrate by means of dilute acid. The product is worked up in the usual manner.

There is obtained the hydrochloride of lævo-1-phenyl-2-methylamino-propanol-1 having a melting point of 214° C., and having the optical rotation given in the literature. The yield amounts to 25–45 grams of the hydrochloride depending upon the nature of the parent material.

Example 2.—360 grams of the ether extract containing phenylpropanolone used as parent material in Example 1, are subjected to distillation under reduced pressure. 300 grams of the fraction which distils at 100–150° C. under a pressure of 14 millimetres are subjected to catalytic hydrogenation in presence of colloidal platinum (70 cc. of a solution of 1 per cent strength) and 85 grams of a solution of methylamine of 33 per cent strength. It is advantageous to add some ether to the reaction mixture. When absorption of hydrogen is complete, the ethereal solution is shaken with hydrochloric acid and the lævo-1-phenyl-2-methylamino-propanol-1 is isolated in known manner from the hydrochloric acid extract.

The hydrochloride melts at 214° C. and has the optical rotation given in the literature. The yield of the hydrochloride amounts to 110 grams.

Example 3.—100 grams of lævo 1-phenylpropanol-1-one-2 isolated by the method of Neuberg (Biochemische Zeitschrift Vol. 128, 1922, page 611) are dissolved in 200 cc. of ether, 75 grams of a solution of methylamine of 33 per cent strength are added and the whole is shaken for about half an hour; condensation occurs with evolution of heat. The reaction mixture is then treated with hydrogen in presence of 70 cc. of a colloidal solution of platinum of 1 per cent strength. The reduction product is worked up in the manner indicated in Example 2.

The hydrochloride of lævo-1-phenyl-2-methyl-amino-propanol-1 crystallizes from alcohol in the form of coarse prisms having a melting point of 214-216° C. The free base melts at 40° C.

We claim:

1. A method for the manufacture of lævo-1-phenyl-2-methylamino-propanol-1 which comprises acting upon the reaction product of lævo-1-phenyl-propanol-1-one-2 and methylamine and a reducing agent and reducing the condensation product, while substantially avoiding formation of racemic final by-products.

2. A method for the manufacture of lævo-1-phenyl-2-methylamino-propanol-1 which comprises acting upon an extract not further purified of a mixture containing lævo-phenyl-propanol-1-one-2 of the kind produced by the fermentation of a sugar in presence of benzaldehyde, with methylamine and a reducing agent, while substantially avoiding formation of racemic final by-products.

3. A method for the manufacture of lævo-1-phenyl-2-methylamino-propanol-1 which comprises condensing a distillate not further purified of a mixture containing lævo-phenyl-propanol-1-one-2 of the kind produced by the fermentation of a sugar in presence of benzaldehyde, with methylamine and reducing the condensation product, while substantially avoiding formation of racemic final by-products.

4. A method for the manufacture of lævo-1-phenyl-2-methylamino-propanol-1 which comprises condensing an extract not further purified of a mixture containing lævo-phenyl-propanol-1-one-2 of the kind produced by the fermentation of a sugar in presence of benzaldehyde, with methylamine and reducing the condensation product, while substantially avoiding formation of racemic final by-products.

5. A method for the manufacture of lævo-1-phenyl-2-methylamino-propanol-1 which comprises the steps, running the ethereal extract not further purified of the product obtained by fermentation of a sugar in presence of benzaldehyde into a solution of methylamine in ether in presence of an activated aluminium, water being added simultaneously, filtering the ethereal solution when the reaction is complete, extracting from the filtrate the optically active base which has been formed by means of dilute hydrochloric acid and isolating the hydrochloride of lævo-1-phenyl-2-methylamino-propanol-1 in the usual manner, while simultaneously with said steps, substantially avoiding formation of racemic final by-products.

6. A method for the manufacture of lævo-1-phenyl-2-methylamino-propanol-1 which comprises the steps, distilling under reduced pressure the ethereal extract not further purified of the product obtained by fermentation of a sugar in presence of benzaldehyde, subjecting the fraction which distills at 100-150° C. under a pressure of 14 millimetres to catalytic reduction in presence of colloidal platinum and methylamine, extracting the ethereal solution with hydrochloric acid and isolating the hydrochloride of lævo-1-phenyl-2-methylamino-propanol-1 in the usual manner, while simultaneously with said steps, substantially avoiding formation of racemic final by-products.

7. A method for the manufacture of lævo-1-phenyl-2-methylamino-propanol-1 which comprises the steps, condensing lævo-1-phenyl-propanol-1-one-2 with methylamine in ethereal solution, treating the reaction mixture with hydrogen in presence of colloidal platinum, extracting the ethereal solution with hydrochloric acid and isolating the hydrochloride of lævo-1-phenyl-2-methylamino-propanol-1 in the usual manner, while simultaneously with said steps, substantially avoiding formation of racemic final by-products.

8. A method for the manufacture of lævo-ephedrine which comprises treating lævo-1-phenyl-propanol-1-one-2 condensed with methylamine with a reducing agent in the presence of a metallic hydrogenation catalyst and reducing the condensation product to form lævo-1-phenyl-2-methylamino-propanol-1.

GUSTAV HILDEBRANDT.
WILFRID KLAVEHN.